R. EINBIGLER.
GALVANIC-BATTERY.

No. 177,996. Patented May 30, 1876.

Witnesses
Charles L. Barrick
R. Rowley

Inventor
Rudolf Einbigler

UNITED STATES PATENT OFFICE.

RUDOLF EINBIGLER, OF NEW YORK, N. Y.

IMPROVEMENT IN GALVANIC BATTERIES.

Specification forming part of Letters Patent No. 177,996, dated May 30, 1876; application filed January 3, 1876.

*To all whom it may concern:*

Be it known that I, RUDOLF EINBIGLER, of the city, county, and State of New York, have invented an Improvement in Automatically Feeding and Equalizing the Charges or Exciting-Fluids in Galvanic Batteries, of which the following is a specification:

The object of my invention is to overcome the unequal exhaustion of the battery power of the different cups composing the battery consequent upon a more rapid evaporation of the exciting-fluid in one cup over that of another cup, and thus weakening the power of the battery. And the nature of my invention consists in combining with a distributer or charging-reservoir one or more cups of a galvanic battery by means of suitable service-pipes, whereby the exciting-fluid for charging the cups can be equalized throughout the entire series of cups composing the battery; also, in combining with the distributer or charging-reservoir a float detector, to indicate the exhaustion of exciting-fluids in the battery, and, by its connection with the faucet of a water-supply pipe, at the same time let on a new supply of water to the charging-reservoir, to become saturated with the sulphate of copper or other material used for exciting galvanic action in the battery.

But to describe my invention more particularly I will refer to the accompanying drawings, forming a part of this specification, the same letters of reference, wherever they occur, referring to similar parts.

Figure 1:
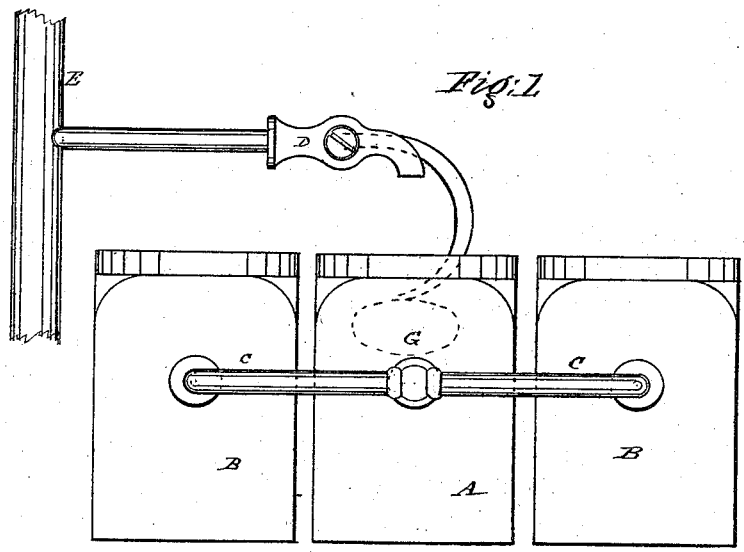
Figure 2:
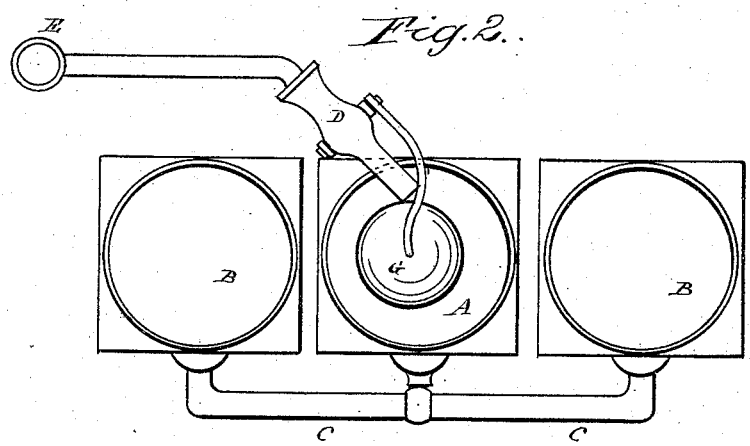

Figure 1 is a side elevation of the apparatus. Fig. 2 is a plan view of the same.

Letter A represents a distributer or charging-reservoir, which, for convenience of arrangement, and at the same time as fully showing the principles of my invention, is shown in combination with a two-cup battery, as represented by the letters B, by means of the service or branching pipes C, having their ends securely luted into the sides of the battery-cups, on the same level with that of its main connection with distributer-reservoir.

The object of this connection of the battery-cups with the distributer-reservoir is to keep each of the cups of the battery equally charged to any required height by the saturated charging-fluid contained in the distributer-reservoir.

To obtain the saturated charging-fluid a large excess of sulphate of copper, or other substance or material for exciting galvanic action, is constantly kept in the reservoir. Therefore, as the fluid is diminished in it by distribution, the float G, by sinking, will open the cock D of the fountain-pipe or tank E to replenish the deficiency, and, when so replenished, cut off the water-supply again, and thus automatically keep the battery of constant and equal strength at all times.

It will be obvious that the distributer or charging-reservoir may be made of any size required for a battery of two or more cups, or for charging numerous independent batteries, such as are commonly used in large telegraph offices for the different lines of wires constantly in use, the only requirement for such general use being a greater number of service-pipes C, in connection with the distributer or charging-reservoir, and that the batteries be so arranged as to permit the exciting-fluid to attain the same equality in all the cups composing the battery.

Having now described my improvements, I will proceed to set forth what I claim and desire to secure by Letters Patent of the United States.

I claim—

1. The battery-cups B, having through their sides a perforation, as a means of connecting the cups of a battery together by branch service-pipes, as and for the purposes set forth.

2. In combination with the said perforated battery-cups B, the distributer-pipe C, reservoir A, float G, and water-supply cock D, as and for the purposes set forth.

RUDOLF EINBIGLER.

Witnesses:
CHARLES L. BARRITT,
R. ROWLEY.